Jan. 6, 1959  J. B. ANDERSON  2,867,718
GLARE REDUCING SHIELD
Filed Oct. 1, 1956 2 Sheets-Sheet 1

INVENTOR.
James B. Anderson

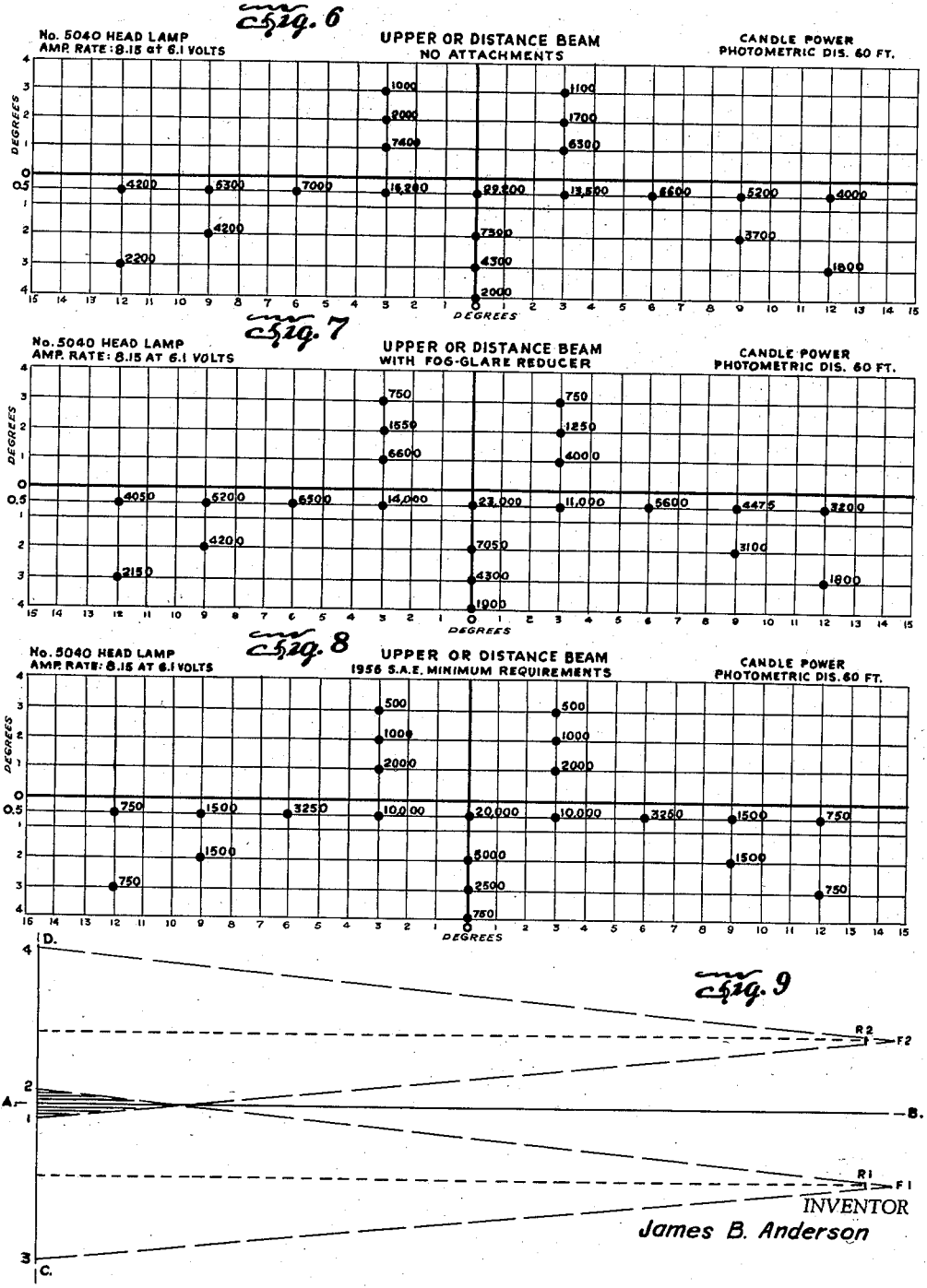

United States Patent Office 2,867,718
Patented Jan. 6, 1959

2,867,718
GLARE REDUCING SHIELD
James B. Anderson, Garland, Tex.

Application October 1, 1956, Serial No. 613,152

1 Claim. (Cl. 240—46.01)

This invention relates to improvements in glare suppressors or reducers for use in connection with fixed beam automotive head lamps.

Glare from fog is, of course, caused by light reflection from the minute water particles which make up fog; and likewise from certain kinds of snow and sleet, as well as rain. Numerous devices have been made to suppress or reduce this reflected light, such as shields covering the upper half of the lens. These shields have been made of tinted glass, others of opaque material, cutting off too much light. Shields have been made triangular in shape with the base mounted at the top of the lens and the point at the center of the lens; some shields were made with this lower edge in the shape of an arc, concave and convex. These former attempts to reduce reflected light were only partially effective and have generally been abandoned for this and other reasons. Recently, opaque shields have been mounted within the lamps, over the filaments to cut off direct light and some indirect light from the upper half of the lens. These convert direct light into indirect light and merely increase the diffusion in the upper half. In dual beam lamps, these devices affect mainly the upper beam.

Accordingly, the principal object of the invention is to provide a new and improved glare reducer for automotive head lamps. A drawing included in this application illustrates one form of the glare reducer constructed in accordance with the invention.

Broadly, the invention comprises a light intercepting device or shield, preferably in the form of a band, or strip, made of opaque material having a non-reflecting back surface. The strip is mounted over the outside of the lamp lens extending along the vertical center-line from the top edge of the lens downwardly to at least the horizontal center-line. It is shaped to conform closely with the curvature of the lens. The top end of the strip is formed to fit or hook over the rounded rim of the lens; and a fin, or flange, is mounted on the outside of the strip at a right angle along its vertical center-line, to make the strip relatively rigid. The lamp housing extension piece, which supports and retains the lamp, usually fits tightly enough to retain the glare reducer in place. However, a spring is provided to hold the glare reducer in proper position if the housing extension, for any reason, does not fit tightly enough. One end of this spring engages an opening in the lower end of the flange, while the other end is held by a screw in the bottom center of the housing extension. The width of the strip, in relation to the size of the lamp, is an important factor for obtaining the maximum glare reduction. This will be explained more fully presently.

In the drawings,

Figure 6 is a photometric diagram of the upper beam of a two filament lamp without the glaer reducer attachment.

Figure 7 is a photometric diagram of the upper beam of a two filament lamp with the glare reducer mounted on the lamp.

Figure 8 is a photometric diagram showing the minimum 1956 S. A. E. requirements for the upper beam.

Figure 9 is a diagram indicating the shadow area of direct light interception by the glare reducer.

The following tabulation shows the effect of the glare reducer on the candlepower of the lower beam of the same two filament lamp:

| Location [1] | Limits | | No Glare Reducer | With Glare Reducer |
|---|---|---|---|---|
| | Max. | Min. | | |
| 1L-1U | 500 | | 500 | 350 |
| 1L-½U | 800 | | 800 | 750 |
| 1L-½D | 2,000 | | 2,000 | 1,900 |
| 1L-1D | | 1,000 | 1,900 | 1,870 |
| 1L-1½D | 5,000 | | 5,000 | 4,800 |
| 9L-1½D | | 750 | 1,375 | 1,100 |
| 15L-2D | | 500 | 1,000 | 950 |
| 1R-1½U | 1,000 | | 400 | 300 |
| 1R-½U | 2,000 | | 1,800 | 1,100 |
| 1R-½D | 10,050 | | 7,100 | 4,700 |
| 3R-1½D | | 3,750 | 7,300 | 4,750 |
| 3R-1½D | | 10,000 | 13,050 | 10,150 |
| 9R-1½D | | 750 | 1,850 | 1,600 |
| 15R-2D | | 500 | 1,650 | 1,500 |
| 4R-4D | 12,500 | | 6,475 | 6,200 |

[1] Degrees left, right, up or down from center.

Figure 1:
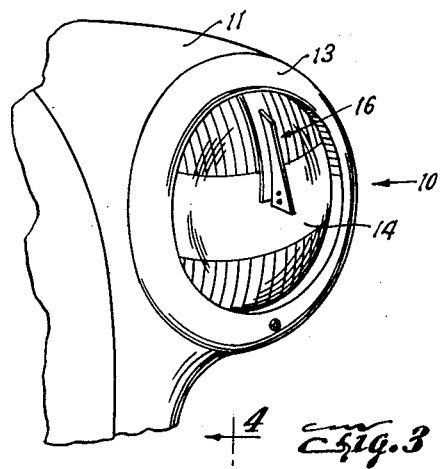
Figure 1 is a perspective view of one automotive head lamp showing the glare reducer in place.
Figure 2:
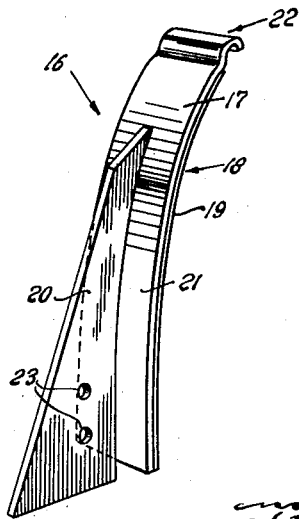
Figure 2 is a perspective view of the glare reducer itself, without the hold-down spring.
Figure 3:
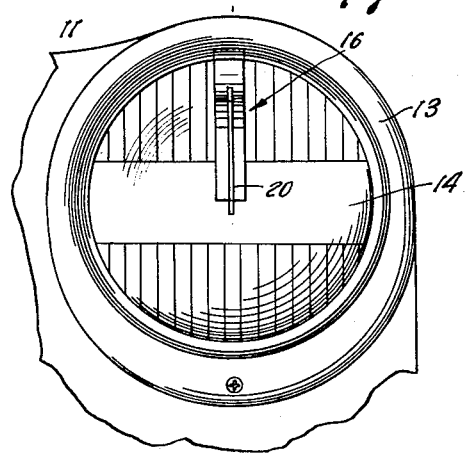
Figure 3 is a front view of one head lamp with the glare reducer mounted thereon.
Figure 4:
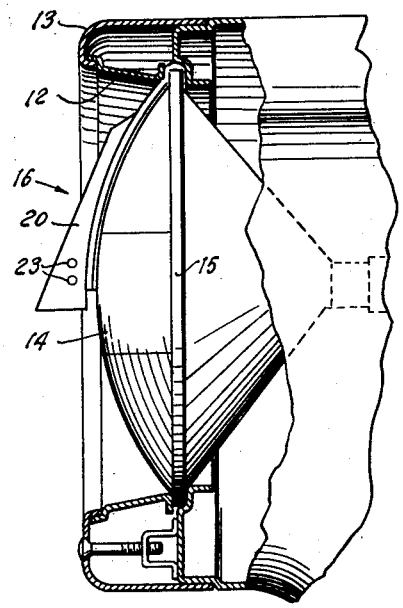
Figure 4 is a partial vertical section through the lamp housing taken on the center-line 4—4 of Figure 3.
Figure 5:
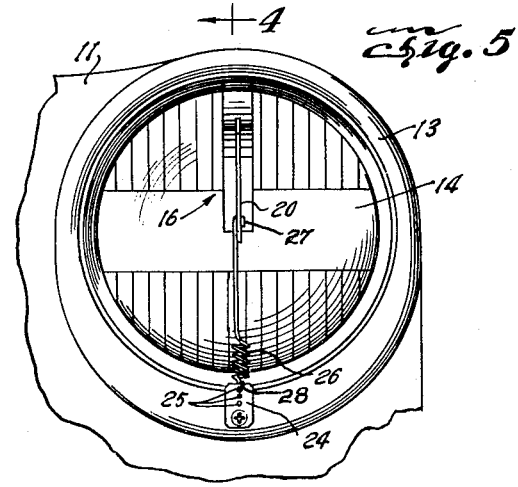
Figure 5 is the same as Figure 3, but with the hold-down spring added.

Continuing now with a more detailed description of the invention, reference numeral 10, Fig. 1, of the drawing designates generally the glare reducer and lamp assembly which is supported in the head lamp housing 11, by the extension piece 12, Fig. 4, and the rim 13. The head lamp incorporates the lens 14, which has the rounded edge 15, said extension piece bearing against said rounded edge to hold said head lamp in place. The invention itself, shown in Figure 2, and generally identified by the numeral 16, comprises a strip 17, made of opaque material formed in a curve to substantially conform with the curvature of the lens upon which it is to be placed; the nonreflecting back 18, of said strip, is formed by a covering or coating 19, of non-reflecting material applied thereon; and a fin, or flange 20, mounted on the front 21, of said strip, along its vertical center-line and at right angle to it, the top edge of said strip being shaped to fit or hook over said rounded edge of said lens, by which it is supported over the face of the lens; one or more openings 23, in the lower portion of said flange; a tab 24, mounted on said rim 13, at the bottom on the vertical center-line; said tab having one or more openings 25; and a spring 26, the upper end 27 of which engages any one of said openings in said flange; the lower end 28, engaging any one of said openings in said tab. This concludes the more detailed description of the invention.

From a practical standpoint, the limit of direct light suppression is fixed by the minimum amount of illumination required. This determines the maximum allowable width of the strip. Using a No. 5040 improved sealed beam head lamp, it has been found, through numerous experiments, that a strip width of one-tenth of the effective lens diameter gives very satisfactory results. Data from a test report made by the Electric Testing Laboratories, New York city, is presented in Figures 6, 7, and 8, covering tests made on the head lamp referred to above. Figure 6 gives the candlepower of the lamp without use of the glare reducer invention; Figure 7 gives the candlepower with the glare reducer in use; and Figure 8 gives the minimum candlepower requirements of the 1956 S. A. E. code. A comparison of the values of Figure 7 with those of Figure 8 shows that the candlepower of the head lamp with the glare reducer in use was, in every instance, safely above the minimum S. A. E. requirements. Slight variations in the ratio of the width to diameter is not critical. However, if the strip is too narrow, the increase of diffused light practically destroys its effectiveness; if the strip is too wide, it reduces the candlepower too much.

In the diagram, Fig. 9, the filaments of two head lamps are designated F-1 and F-2 respectively; the glare reducers are marked R-1 and R-2 respectively, while C-D designates a reflecting medium, or surface, located at a point beyond the interception of the shadow areas caused by light suppression by the glare reducer strips.

Glare reduction is accomplished by the glare reducer invention through the suppression of a portion of the direct light rays emanating from the lamp filaments, as well as a portion of the redirect light coming from the lamp reflectors. Without lamp reflectors, total light suppression, or shadow on a reflecting surface, would occur in the path-ways or "areas" 1-4 and 2-3 extending from the head lamps. However, redirect light from the lamp reflectors and direct light which passes each side of the glare reducer, or strip, spread over the "areas" 1-3 and 2-4. This light causes some reflection or glare from any reflecting surface which it strikes. But considerable light interference takes place which contributes further to the reduction of light in these light paths, and thus, to the reduction of reflection or glare from objects in the light paths. Except for minor deflections of light rays, practically no light enters the space-area 1-2. Here the shadow edges are clearly distinguishable, defining a dark vertical stripe of substantially no glare. This permits seeing into a fog, for example, beyond the plane of reflection or glare on either side of the shadow mark. The density of the fog determines the distance to the reflecting plane from the lamps and also the distance of sight penetration into the fog through the darkened area. Decreasing density increases these distances, and on moving through a fog bank, the reflecting plane and stripe gradually move further away, to fade out as one emerges therefrom. The foregoing is based on the phenomena observed during numerous tests made in East and South Texas fogs. Similar results are had in sleet and snow and in some forms of rain.

It will be apparent to those skilled in the art that various changes and modifications can be made in the form illustrated and described herein without departing from the invention, and it is intended that the specification and appended claim include such modifications as fall within the true spirit and scope of the invention.

What is claimed is:

In combination with an automobile head light having a lens and a pair of housing members adapted to clamp the peripheral surfaces of the light between them whereby the light is supported and retained in place, a glare reducing shield comprising a strip, formed of opaque material and having a non-reflecting back surface, positioned over the outside of the lens and extending downwardly from the top edge of the lens, along its vertical center line, to substantially its horizontal center line, the strip being curved to conform substantially to the curvature of the lens and the upper end of the strip being shaped for engagement with the peripheral surfaces of the light and being secured thereto by the housing members, a vertically disposed fin attached to the strip along its vertical center line and extending outwardly at right angles thereto, a tab attached to one of the housing members below the lens, and a tension spring connected at its ends to the fin and the tab whereby the lower end of the strip is secured in engagement with the lens.

References Cited in the file of this patent

UNITED STATES PATENTS

| | | |
|---|---|---|
| 1,314,590 | Hawthorne | Sept. 2, 1919 |
| 1,325,619 | Clemmans | Dec. 23, 1919 |
| 1,397,822 | Peters | Nov. 22, 1921 |
| 1,528,554 | Klohs | Mar. 3, 1925 |
| 1,551,488 | Ische et al. | Aug. 25, 1925 |
| 1,566,119 | Reed | Dec. 15, 1925 |
| 2,550,594 | Petrakakis | Apr. 24, 1951 |